United States Patent
Jiang et al.

(10) Patent No.: US 11,824,836 B2
(45) Date of Patent: Nov. 21, 2023

(54) SECURING MICROSERVICES UTILIZING A PROACTIVE CONDITION MAP

(71) Applicant: International Business Machines Corporation, Armonk, NY (US)

(72) Inventors: Peng Hui Jiang, Beijing (CN); Meng Wang, Beijing (CN); Kun Yang, Beijing (CN); Jun Su, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 102 days.

(21) Appl. No.: 17/453,887

(22) Filed: Nov. 8, 2021

(65) Prior Publication Data
US 2023/0146667 A1  May 11, 2023

(51) Int. Cl.
*H04L 29/06* (2006.01)
*H04L 9/40* (2022.01)

(52) U.S. Cl.
CPC .......... *H04L 63/0281* (2013.01); *H04L 63/10* (2013.01); *H04L 63/20* (2013.01)

(58) Field of Classification Search
CPC ..... H04L 63/0281; H04L 63/10; H04L 63/20; H04L 63/126; H04L 63/1425; H04L 63/14
USPC .......................................................... 726/1
See application file for complete search history.

(56) References Cited

U.S. PATENT DOCUMENTS

| 7,831,693 | B2 | 11/2010 | Lai |
| 8,788,097 | B2 | 7/2014 | Drees et al. |
| 11,233,826 | B2 * | 1/2022 | Nakagoe ................. H04L 63/20 |
| 11,354,152 | B2 * | 6/2022 | Nikain ................. G06F 9/5072 |
| 2020/0366580 | A1 | 11/2020 | Sinha |
| 2020/0366697 | A1 | 11/2020 | Vittal |

FOREIGN PATENT DOCUMENTS

CN           112817725 A       5/2021

OTHER PUBLICATIONS

Anonymous, "System and Method to Resiliently Handle Error in Dependencies Between Microservices," An IP.com Prior Art Database Technical Disclosure, IPCOM000256476D, Dec. 3, 2018, 5 pages. https://priorart.ip.com/IPCOM/000256476.

* cited by examiner

*Primary Examiner* — Longbit Chai
(74) *Attorney, Agent, or Firm* — Yee & Associates, P.C.

(57) ABSTRACT

Validating microservice calls is provided. It is determined whether a microservice call to a microservice hosted by a computer is valid based on a policy in a proactive condition map of a validation proxy that matches the microservice call. In response to determining that the microservice call is invalid based on the policy in the proactive condition map that matches the microservice call, the microservice call is blocked to the microservice. It is determined whether the microservice call needs to be redirected to another microservice based on the policy. In response to determining that the microservice call does need to be redirected to another microservice based on the policy, the microservice call is redirected to the other microservice with a callback to the microservice.

20 Claims, 11 Drawing Sheets

SECURING MICROSERVICES UTILIZING A PROACTIVE CONDITION MAP

BACKGROUND

1. Field

The disclosure relates generally to microservices and more specifically to utilizing a validation proxy on a host node that includes a proactive condition map comprised of a set of global precondition validation policies, a set of global postcondition validation policies, a set of local precondition validation policies, and a set of local postcondition validation policies to validate microservice calls to secure microservices in an orchestration environment.

2. Description of the Related Art

A microservice architecture arranges a single application as a collection of loosely-coupled and independently deployable microservices that communicate with each other via a message bus, application programming interface, or the like. In a microservices architecture, microservices are fine-grained. In other words, a microservice is a self-contained piece of functionality of the application. Thus, each function of the application is a microservice. In contrast, in a monolithic architecture all functions of the application are tightly coupled and run as a single service.

SUMMARY

According to one illustrative embodiment, a computer-implemented method for validating microservice calls is provided. A computer, using a validation proxy of the computer, determines whether a microservice call to a microservice hosted by the computer is valid based on a policy in a proactive condition map of the validation proxy that matches the microservice call. In response to the computer determining that the microservice call is invalid based on the policy in the proactive condition map that matches the microservice call, the computer, using the validation proxy, blocks the microservice call to the microservice. The computer, using the validation proxy, determines whether the microservice call needs to be redirected to another microservice based on the policy. In response to the computer determining that the microservice call does need to be redirected to another microservice based on the policy, the computer, using the validation proxy, redirects the microservice call to the other microservice with a callback to the microservice. According to other illustrative embodiments, a computer system and computer program product for validating microservice calls are provided.

DETAILED DESCRIPTION

Figure 1:
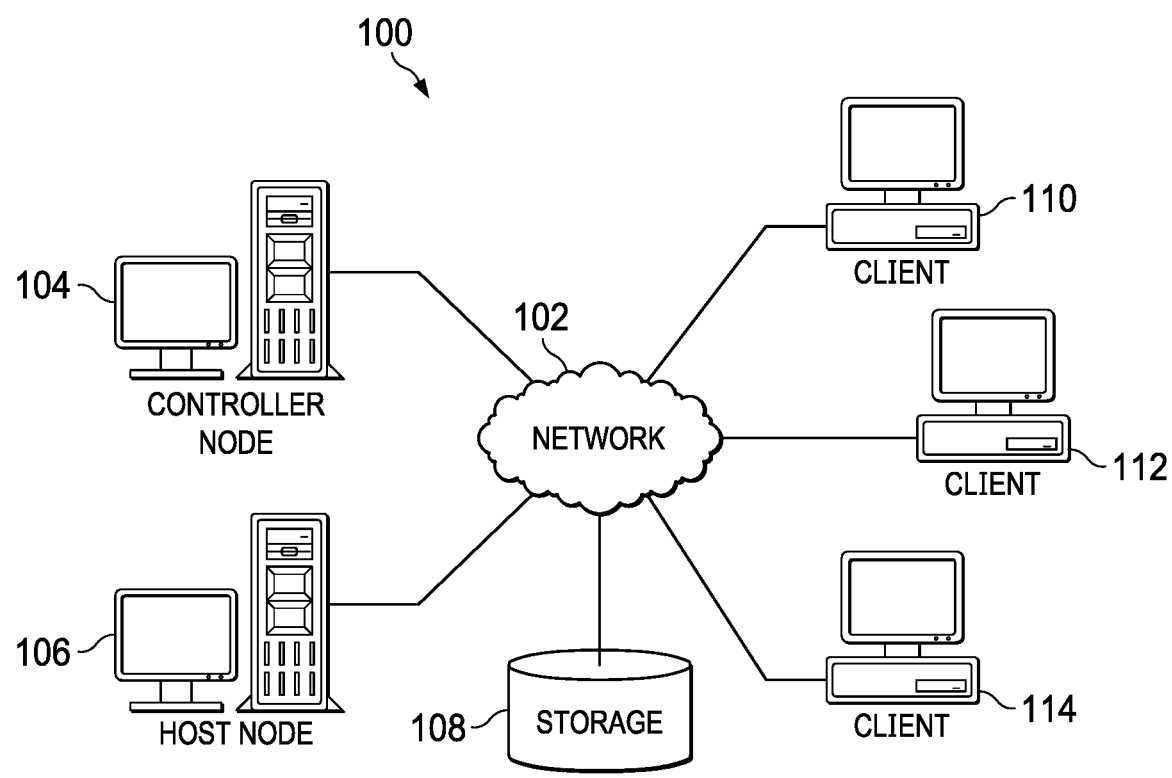
FIG. 1 is a pictorial representation of a network of data processing systems in which illustrative embodiments may be implemented.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
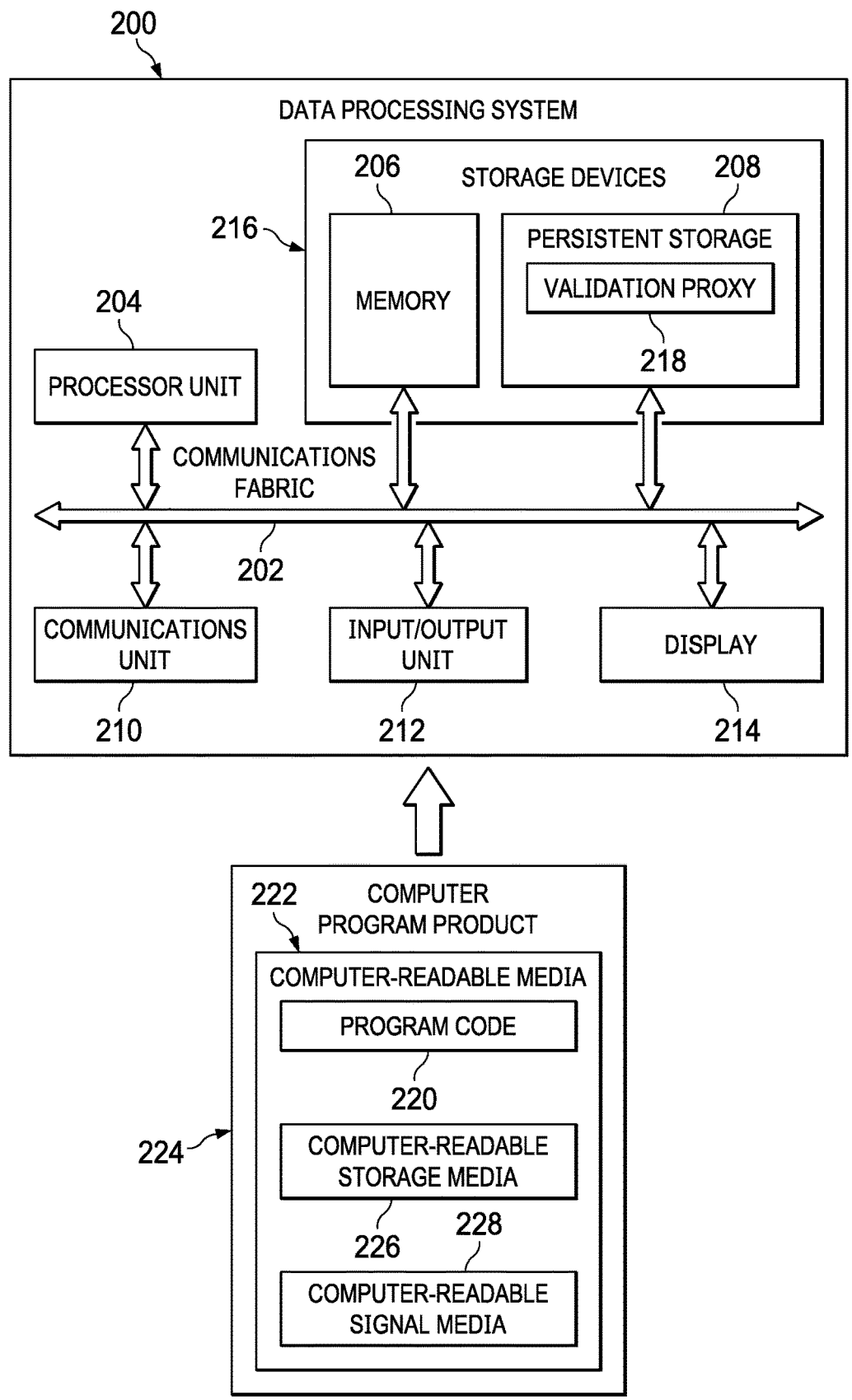
FIG. 2 is a diagram of a data processing system in which illustrative embodiments may be implemented.
Figure 3:
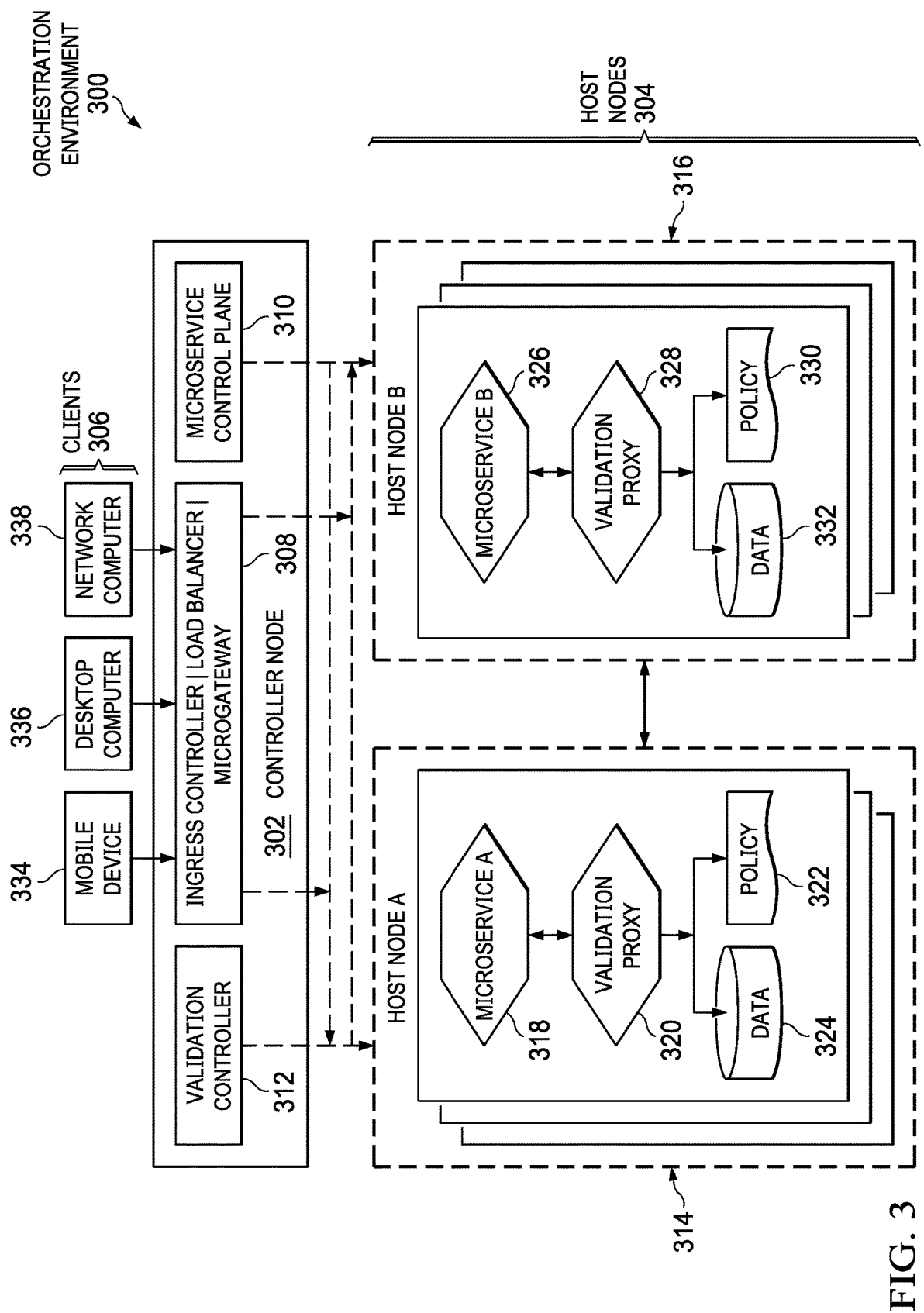
FIG. 3 is a diagram illustrating an example of an orchestration environment in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. In this example, network data processing system 100 represents an orchestration environment, such as, for example, Kubernetes® (a registered trademark of the Linux Foundation of San Francisco, California), which provides automated deployment, scaling, and operations of a microservice architecture comprised of a plurality of microservices corresponding to an application that provides a service running on a set of host nodes. However, it should be understood that Kubernetes is intended as an example architecture only and not as a limitation on illustrative embodiments. In other words, illustrative embodiments may utilize any type of orchestration architecture, platform, infrastructure, or environment that provides automated deployment, scaling, and operations of microservices across host nodes.

Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, controller node 104 and host node 106 connect to network 102, along with storage 108. Controller node 104 and host node 106 may be, for example, server computers with high-speed connections to network 102. Also, it should be noted that controller node 104 and host node 106 may each represent a cluster of server computers in one or more data centers. Alternatively, controller node 104 and host node 106 may each represent multiple computing nodes in one or more cloud environments. Furthermore, controller node 104 and host node 106 may contain one or more virtual machines.

In addition, controller node 104 is a main controlling unit of a cluster of host nodes (also known as worker nodes, compute nodes, minions, and the like), managing the cluster's application workload and directing communication across the cluster. Host node 106 hosts a set of microservices, each microservice performing a specific function of the application providing the service. The service provided by the application may be any type of service, such as, for example, data processing, transaction processing, artificial intelligence processing, natural language processing, image processing, computer vision, scientific calculations, forecasts, predictions, recommendations, or the like. Further, host node 106 utilizes a validation proxy to secure the set of microservices hosted by host node 106 by validating microservice calls to the microservices by clients 110, 112, and 114 or external calling microservices based on local and global validation policies contained in the proactive condition map of the validation proxy.

Client 110, client 112, and client 114 also connect to network 102. Clients 110, 112, and 114 are clients of controller node 104 and host node 106. In this example, clients 110, 112, and 114 are shown as desktop or personal computers with wire communication links to network 102. However, it should be noted that clients 110, 112, and 114 are examples only and may represent other types of data processing systems, such as, for example, network computers, laptop computers, handheld computers, smart phones, smart watches, smart glasses, smart televisions, smart vehicles, smart appliances, gaming devices, virtual reality devices, and the like, with wire or wireless communication links to network 102. Users of clients 110, 112, and 114 may utilize clients 110, 112, and 114 to submit microservice calls for the microservices hosted by host node 106.

Storage 108 is a network storage device capable of storing any type of data in a structured format or an unstructured format. In addition, storage 108 may represent a plurality of network storage devices. Further, storage 108 may store identifiers and network addresses for a plurality of host nodes, identifiers for microservices hosted by the plurality of host nodes, sets of global validation policies corresponding to different microservices, a plurality of identified microservice call paths corresponding to different microservices, identifiers and network addresses for a plurality of client devices, identifiers for a plurality of different client device users, and the like. Furthermore, storage 108 may store other types of data, such as authentication or credential data that may include usernames, passwords, and the like associated with, for example, client device users, system administrators, and the like.

In addition, it should be noted that network data processing system 100 may include any number of additional nodes, clients, storage devices, and other devices not shown. Program code located in network data processing system 100 may be stored on a computer-readable storage medium or a set of computer-readable storage media and downloaded to a computer or other data processing device for use. For example, program code may be stored on a computer-readable storage medium on controller node 104 and downloaded to host node 106 over network 102 for use on host node 106.

In the depicted example, network data processing system 100 may be implemented as a number of different types of communication networks, such as, for example, an internet, an intranet, a wide area network, a local area network, a telecommunications network, or any combination thereof. FIG. 1 is intended as an example only, and not as an architectural limitation for the different illustrative embodiments.

As used herein, when used with reference to items, "a number of" means one or more of the items. For example, "a number of different types of communication networks" is one or more different types of communication networks. Similarly, "a set of," when used with reference to items, means one or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

With reference now to FIG. 2, a diagram of a data processing system is depicted in accordance with an illustrative embodiment. Data processing system 200 is an example of a computer, such as host node 106 in FIG. 1, in which computer-readable program code or instructions implementing the microservice call validation processes of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. As used herein, a computer-readable storage device or a computer-readable storage medium is any piece of hardware that is capable of storing information, such as, for example, without limitation, data, computer-readable program code in functional form, and/or other suitable information either on a transient basis or a persistent basis. Further, a computer-readable storage device or a computer-readable storage medium excludes a propagation medium, such as transitory signals. Furthermore, a computer-readable storage device or a computer-readable storage medium may represent a set of computer-readable storage devices or a set of computer-readable storage media. Memory 206, in these examples, may be, for example, a random-access memory (RAM), or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above. The media used by persistent storage 208 may be removable. For example, a removable hard drive may be used for persistent storage 208.

In this example, persistent storage 208 stores validation proxy 218. However, it should be noted that even though validation proxy 218 is illustrated as residing in persistent storage 208, in an alternative illustrative embodiment, validation proxy 218 may be a separate component of data processing system 200. For example, validation proxy 218 may be a hardware component coupled to communication fabric 202 or a combination of hardware and software components.

Validation proxy 218 controls the process of validating microservice calls to a set of microservices, which corresponds to a service provided by a monolithic application, hosted by data processing system 200 using local and global validation policies included in a proactive condition map stored on data processing system 200 to increase security of the set of microservices. As a result, data processing system 200 operates as a special purpose computer system in which validation proxy 218 in data processing system 200 enables validation of a received microservice call prior to allowing the microservice call to pass to a corresponding microservice for processing. In particular, validation proxy 218 transforms data processing system 200 into a special purpose computer system as compared to currently available general computer systems that do not have validation proxy 218.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer-readable program code that may be read and run by a processor in processor unit 204. The program instructions, in the different embodiments, may be embodied on different physical computer-readable storage devices, such as memory 206 or persistent storage 208.

Program code 220 is located in a functional form on computer-readable media 222 that is selectively removable and may be loaded onto or transferred to data processing system 200 for running by processor unit 204. Program code 220 and computer-readable media 222 form computer program product 224. In one example, computer-readable media 222 may be computer-readable storage media 226 or computer-readable signal media 228.

In these illustrative examples, computer-readable storage media 226 is a physical or tangible storage device used to store program code 220 rather than a medium that propagates or transmits program code 220. Computer-readable storage media 226 may include, for example, an optical or magnetic disc that is inserted or placed into a drive or other device that is part of persistent storage 208 for transfer onto a storage device, such as a hard drive, that is part of persistent storage 208. Computer-readable storage media 226 also may take the form of a persistent storage, such as a hard drive, a thumb drive, or a flash memory that is connected to data processing system 200.

Alternatively, program code 220 may be transferred to data processing system 200 using computer-readable signal media 228. Computer-readable signal media 228 may be, for example, a propagated data signal containing program code 220. For example, computer-readable signal media 228 may be an electromagnetic signal, an optical signal, or any other suitable type of signal. These signals may be transmitted over communication links, such as wireless communication links, an optical fiber cable, a coaxial cable, a wire, or any other suitable type of communications link.

Further, as used herein, "computer-readable media 222" can be singular or plural. For example, program code 220 can be located in computer-readable media 222 in the form of a single storage device or system. In another example, program code 220 can be located in computer-readable media 222 that is distributed in multiple data processing systems. In other words, some instructions in program code 220 can be located in one data processing system while other instructions in program code 220 can be located in one or more other data processing systems. For example, a portion of program code 220 can be located in computer-readable media 222 in a server computer while another portion of program code 220 can be located in computer-readable media 222 located in a set of client computers.

The different components illustrated for data processing system 200 are not meant to provide architectural limitations to the manner in which different embodiments can be implemented. In some illustrative examples, one or more of the components may be incorporated in or otherwise form a portion of, another component. For example, memory 206, or portions thereof, may be incorporated in processor unit 204 in some illustrative examples. The different illustrative embodiments can be implemented in a data processing system including components in addition to or in place of those illustrated for data processing system 200. Other components shown in FIG. 2 can be varied from the illustrative examples shown. The different embodiments can be implemented using any hardware device or system capable of running program code 220.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

With increased adoption of cloud computing technology, microservice architectures are becoming more popular. A microservice framework divides a monolithic application into a plurality of independent microservices, which is running as one cloud service. Each of these microservices is generated for a specific single function of the service corresponding to the monolithic application and operates as an independent process. The microservices of the monolithic application are linked by passing parameters via a message bus, for example.

Microservices overcome the disadvantages corresponding to the complexity of monolithic applications. However, microservices raise other issues. For example, one issue with microservices is exposure to inadvertent, improper, unauthorized, or forbidden microservice accesses by client devices or other microservices. In a monolithic application, the calling path can be controlled (e.g., some functions of the application can only be called after preconditional validation). In microservices, the conditional logic is divided and can expose a microservice to attack. For example, microservices are not limited to being called by other microservices comprising a given monolithic application in a correct order for preconditional validation, but can also be called by outside microservices or clients in an incorrect order bypassing preconditional validation. In order to provide adequate microservice security, current solutions duplicate preconditional validation logic in most of the microservices. This duplication of preconditional validation logic in microservices increases code complexity and processing cost.

Illustrative embodiments build and use a proactive condition map, which is comprised of precondition and postcondition validation policies, to secure microservices of a monolithic application corresponding to a service. Illustrative embodiments utilize a validation controller on a controller node to provide global control over the microservices by sending global precondition and post condition validation policies to host nodes hosting the microservices. Illustrative embodiments insert an identifier of a calling source (e.g., a calling microservice, client, or the like) into traffic (e.g., microservice calls) or extract the identifier of the calling source from the traffic for each respective microservice to identify a microservice call path.

Illustrative embodiments accept an incoming microservice call for a particular microservice and pass the microservice call to a validation proxy, which resides on a host node hosting that particular microservice, to perform global precondition validation and global postcondition validation of the current microservice call in accordance with local precondition and postcondition validation policies stored in the validation proxy on the host node. In other words, the global precondition and postcondition validation policies should conform to the local precondition and postcondition validation policies. Consequently, local validation policies of the host node supersede the global validation policies received from the validation controller.

Multiple behaviors can exist for different validation policies. For example, if a microservice call to a particular microservice is from a preconditional microservice (e.g., an authentication microservice) or an equivalent preconditional microservice corresponding to that particular microservice, then illustrative embodiments allow the microservice call to proceed to that particular microservice. Otherwise, if the microservice call is from an unknown microservice, illustrative embodiments redirect the microservice call to the preconditional microservice to verify authorization of the unknown microservice to access that particular microservice corresponding to the microservice call. It should be noted that illustrative embodiments can select multiple preconditional microservices for that particular microservice based on the microservice call utilizing dynamic adjustment. Further, illustrative embodiments track the microservice calls (e.g., footprint or record of a series of microservice calls) in a particular microservice call path to ensure that the correct order of calls to microservices is maintained in accordance with dependencies between microservices.

Illustrative embodiments analyze the call path of the monolithic application and the microservice architecture. Illustrative embodiments utilize data collected from the analysis of the call path as training data for a machine learning model to identify legitimate microservice calls for a given microservice from illegitimate microservice calls. In addition, based on the analysis of the call path, illustrative embodiments dynamically identify the preconditional microservices and functional microservices in the call path and construct a proactive condition map containing global and local precondition validation polices and postcondition validation policies. Illustrative embodiments continue to monitor call paths and dynamically update the provocative condition map as needed when changes occur in the call paths based on detected forbidden invalid microservice calls.

The proactive condition map for a particular microservice includes a global precondition validation policy that checks whether a particular incoming microservice call is valid to pass to the particular microservice (e.g., the called microservice), a local precondition validation policy that checks whether that particular microservice call is valid to transmit within the that particular microservice prior to processing that particular microservice call, a local postcondition validation policy that checks whether that particular microservice call is valid to transmit out of that particular microservice after processing that particular microservice call, and a global postcondition validation policy that checks whether that particular microservice call is valid to send to another microservice in the call path from that particular microservice. It should be noted that a local validation policy overrides any global validation policy.

Thus, illustrative embodiments control the microservice calls (e.g., traffic) to the individual microservices of the monolithic application. By controlling the traffic to the individual microservices, illustrative embodiments ensure that the microservices are called in a correct order (e.g., taking into account dependencies between the microservices) and that predefined and auto-discovered global precondition and postcondition validation policies and local precondition and postcondition validation policies of the proactive condition map are satisfied for each respective microservice in the call path. For example, illustrative embodiments can adjust or redirect a microservice call to a particular microservice so that the microservice call is first sent to a preconditional microservice (e.g., an authentication microservice) to satisfy a precondition validation policy corresponding to that particular microservice. Illustrative embodiments build and use the proactive condition map to secure each microservice of the monolithic application. Consequently, illustrative embodiments decrease complexity of conditional validation logic in microservices of a monolithic application and decrease processing cost for authentication to secure functional microservices by consolidating conditional verification logic in a central validation controller.

Thus, illustrative embodiments provide one or more technical solutions that overcome a technical problem with providing security for microservices corresponding to a service provided by a monolithic application. As a result, these one or more technical solutions provide a technical effect and practical application in the field of microservice security.

With reference now to FIG. 3, a diagram illustrating an example of an orchestration environment is depicted in accordance with an illustrative embodiment. Orchestration environment 300 may be implemented in a network of data processing systems, such as network data processing system 100 in FIG. 1. Orchestration environment 300 is a system of hardware and software components for validating microservice calls to microservices hosted by host nodes to increase security of the microservices.

In this example, orchestration environment 300 includes controller node 302, host nodes 304, and clients 306. Controller node 302 may be, for example, controller node 104 in FIG. 1. Controller node 302 includes ingress controller/load balancer/microgateway 308, microservice control plane 310, and validation controller 312. Ingress controller/load balancer/microgateway 308 receives microservice calls from clients 306, balances workload across host nodes 304, and acts as a gateway for calls to microservices. Microservice control plane 310 manages the microservices. Validation controller 312 generates global precondition and postcondition validation policies corresponding to the microservices based on analyzing microservice call paths. Validation controller 312 sends the global precondition and postcondition validation policies to validation proxies, which contain local precondition and postcondition validation polices, located on respective host nodes.

In this example, host nodes 304 include host node A 314 and host node B 316. Host node A 314 or host node B 316 may be, for example, host node 106 in FIG. 1 or data processing system 200 in FIG. 2. Host node A 314 and host node B 316 may represent a cluster of host nodes running a plurality of microservices corresponding to an application that is providing a particular service to clients 306. Host node A 314 includes microservice A 318, validation proxy 320, policy 322, and data 324. Microservice A 318 preforms a particular function of the application. Validation proxy 320 validates microservice calls to microservice A 318 and microservice calls from microservice A 318. Policy 322 represents a set of local precondition and postcondition validation policies and a set of global precondition and postcondition validation policies that correspond to microservice A 318. A program developer corresponding to microservice A 318 provides the local precondition and postcondition validation policies to validation proxy 320. Validation controller 312 sends the global precondition and postcondition validation policies corresponding to microservice A 318 to validation proxy 320. Data 324 represent statistical analysis data corresponding to microservice call paths to and from microservice A 318. Validation proxy 320 utilizes data 324 to dynamically adjust the local precondition and postcondition validation policies of policy 322. Validation proxy 320 uses the global and local precondition validation policies of policy 322 to validate microservice calls to microservice A 318 and uses the global and local postcondition validation policies of policy 322 to validate microservice calls leaving microservice A 318.

Similarly, host node B 316 includes microservice B 326, validation proxy 328, policy 330, and data 332. Microservice B 326 preforms a different function of the application. Validation proxy 328 validates microservice calls to and from microservice B 326. Policy 330 represents a set of local precondition and postcondition validation policies and a set of global precondition and postcondition validation policies that correspond to microservice B 326. A program developer corresponding to microservice B 326 provides the local precondition and postcondition validation policies to validation proxy 328. Validation controller 312 sends the global precondition and postcondition validation policies corresponding to microservice B 326 to validation proxy 328. Data 332 represent statistical analysis data corresponding to microservice call paths to and from microservice B 326. Validation proxy 328 utilizes data 332 to dynamically adjust the local precondition and postcondition validation policies of policy 330. Validation proxy 328 uses the global and local precondition validation policies of policy 330 to validate microservice calls to microservice B 326 and uses the global and local postcondition validation policies of policy 330 to validate microservice calls leaving microservice B 326. It should be noted that microservice A 318 can send a microservice call to microservice B 326 or microservice B 326 can send a microservice call to microservice A 318.

In this example, clients 306 include mobile device 334, desktop computer 336, and network computer 338. However, clients 306 are intended as examples only and may include any type of client. Mobile device 334, desktop computer 336, and network computer 338 may be, for example, clients 110, 112, and 114 in FIG. 1. Users of clients 306 may utilize clients 306 to send requests for microservices hosted by host nodes 304.

Figure 4:
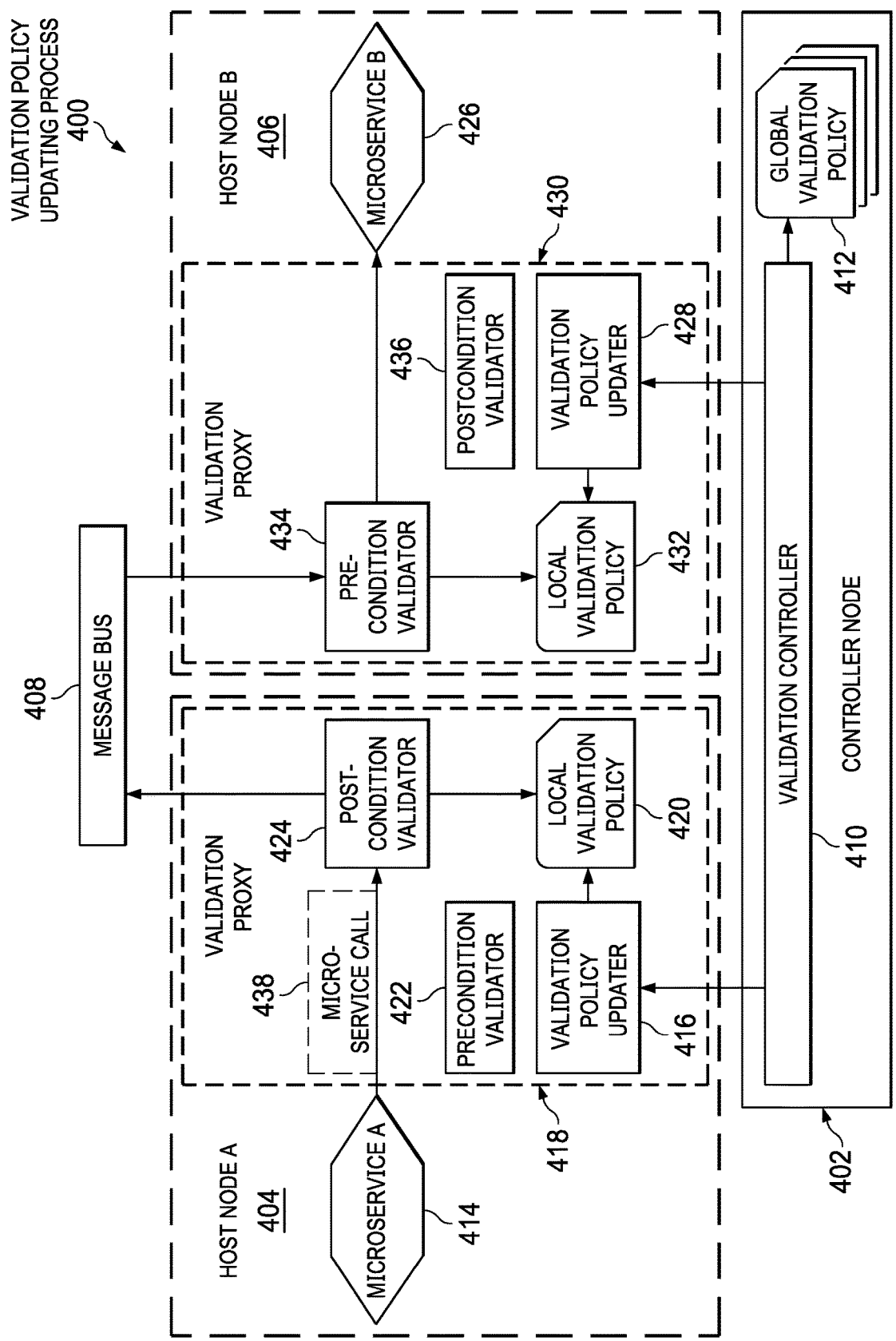
FIG. 4 is a diagram illustrating an example of a validation policy updating process in accordance with an illustrative embodiment.

With reference now to FIG. 4, a diagram illustrating an example of a validation policy updating process is depicted in accordance with an illustrative embodiment. Validation policy updating process 400 may be implemented in an orchestration environment, such as, for example, orchestration environment 300 in FIG. 3.

In this example, validation policy updating process 400 includes controller node 402, host node A 404, host node B 406, and message bus 408. Controller node 402, host node A 404, and host node B 406 may be, for example, controller node 302, host node A 314, and host node B 316 in FIG. 3. Message bus 408 provides a means to pass traffic, such as, for example, microservice calls, to host node A 404 and host node B 406.

Controller node 402 includes validation controller 410, such as, for example, validation controller 312 in FIG. 3. Global validation policy 412 represents sets of global precondition and postcondition validation policies corresponding to different microservices. Validation controller 410 sends global validation policy 412, which represents a set of global precondition and postcondition validation policies corresponding to microservice A 414 running on host node A 404, to validation policy updater 416 of validation proxy 418 of host node A 404. Validation proxy 418 may be, for example, validation proxy 320 in FIG. 3.

Validation policy updater 416 updates local validation policy 420 with the set of global precondition and postcondition validation policies corresponding to microservice A 414. A global precondition validation policy checks whether a particular incoming microservice call is valid to pass to microservice A 414. A global postcondition validation policy checks whether a particular outgoing microservice call from microservice A 414 is valid to send to another microservice in the call path. Local validation policy 420 represents a set of local precondition and postcondition validation policies corresponding to microservice A 414. A local precondition validation policy checks whether a particular incoming microservice call is valid to transmit within microservice A 414 prior to microservice A 414 processing that particular microservice call. A local postcondition validation policy checks whether that particular microservice call is valid to transmit out of microservice A 414 after processing that particular microservice call.

Validation proxy 418 also includes precondition validator 422 and postcondition validator 424. Precondition validator 422 validates all incoming microservice calls to microservice A 414 using the global and local precondition validation policies contained in local validation policy 420. Postcondition validator 424 validates all outgoing microservice calls from microservice A 414 using the local and global postcondition validation policies contained in local validation policy 420.

Similarly, validation controller 410 sends global validation policy 412, which represents a set of global precondition and postcondition validation policies corresponding to microservice B 426 running on host node B 406, to validation policy updater 428 of validation proxy 430 of host node B 406. Validation proxy 430 may be, for example, validation proxy 328 in FIG. 3.

Validation policy updater 428 updates local validation policy 432 with the set of global precondition and postcondition validation policies corresponding to microservice B 426. A global precondition validation policy checks whether a particular incoming microservice call is valid to pass to microservice B 426. A global postcondition validation policy checks whether a particular outgoing microservice call from microservice B 426 is valid to send to another microservice in the call path. Local validation policy 432 represents a set of local precondition and postcondition validation policies corresponding to microservice B 426. A local precondition validation policy checks whether a particular incoming microservice call is valid to transmit within microservice B 426 prior to microservice B 426 processing that particular microservice call. A local postcondition validation policy checks whether that particular microservice call is valid to transmit out of microservice B 426 after processing that particular microservice call.

Validation proxy 430 also includes precondition validator 434 and postcondition validator 436. Precondition validator 434 validates all incoming microservice calls to microservice B 426 using the global and local precondition validation policies contained in local validation policy 432. Postcondition validator 436 validates all outgoing microservice calls from microservice B 426 using the local and global postcondition validation policies contained in local validation policy 432.

In this example, microservice A 414 on host node A 404 sends microservice call 438 to microservice B 426 on host node B 406 via message bus 408. However, postcondition validator 424 intercepts microservice call 438 to make sure that microservice call 438 is valid to pass to microservice B 426 based on the local and global postcondition validation policies of local validation policy 420. Similarly, precondition validator 434 intercepts microservice call 438 to make sure that microservice call 438 is valid to pass to microservice B 426 based on the global and local precondition validation policies of local validation policy 432.

Figure 5:
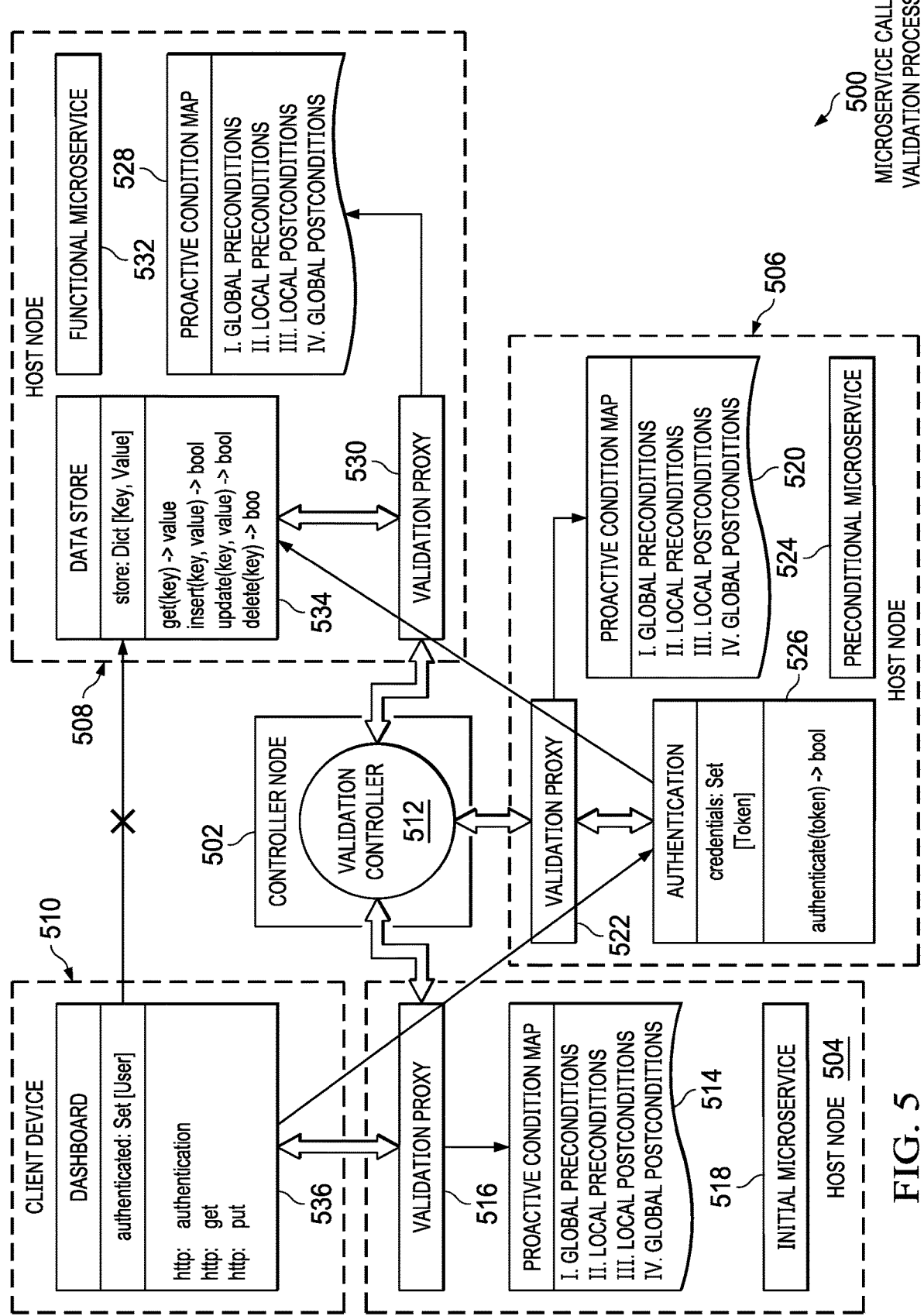
FIG. 5 is a diagram illustrating an example of a microservice call validation process in accordance with an illustrative embodiment.

With reference now to FIG. 5, a diagram illustrating an example of a microservice call validation process is depicted in accordance with an illustrative embodiment. Microservice call validation process 500 may be implemented in an orchestration environment, such as, for example, orchestration environment 300 in FIG. 3.

In this example, microservice call validation process 500 includes controller node 502, host node 504, host node 506, host node 508, and client device 510. Controller node 502 includes validation controller 512. Validation controller 512 dynamically updates proactive condition map 514 of validation proxy 516 on host node 504 with any new global validation policies corresponding to initial microservice 518. A proactive condition map of a validation proxy includes a set of global precondition validation policies, a set of local precondition validation policies, a set of local postcondition validation policies, and a set of global postcondition validation policies. Initial microservice 518 may provide, for example, a login request page to a user of client device 510.

In addition, validation controller 512 dynamically updates proactive condition map 520 of validation proxy 522 on host node 506 with any new global validation policies corresponding to preconditional microservice 524. Preconditional microservice 524 corresponds to authentication 526. Further, validation controller 512 dynamically updates proactive condition map 528 of validation proxy 530 on host node 508 with any new global validation policies corresponding to functional microservice 532. Functional microservice 532 corresponds to data store 534.

Microservice call validation process 500 needs the user of client device 510 to authenticate prior to the user posting a microservice call to data store 534 of functional microservice 532 (e.g., posting a set of data operations, such as get, insert, update, and delete, to data store 534). This need for user authentication can be expressed as, for example, dashboard 536 of client device 510 cannot send a microservice call to data store 534 of functional microservice 532 prior to sending an authenticate microservice call to authentication 526 of preconditional microservice 524 and data store 534 of functional microservice 532 receiving a response from authentication 526 of preconditional microservice 524 indicating that the user of client device 510 is authenticated and the microservice call is valid based on the global and local validation policies of the validation proxies. In other words, microservice call validation process 500 controls validation of microservice calls using the validation proxies located on the host nodes hosting the microservices.

Figure 6:
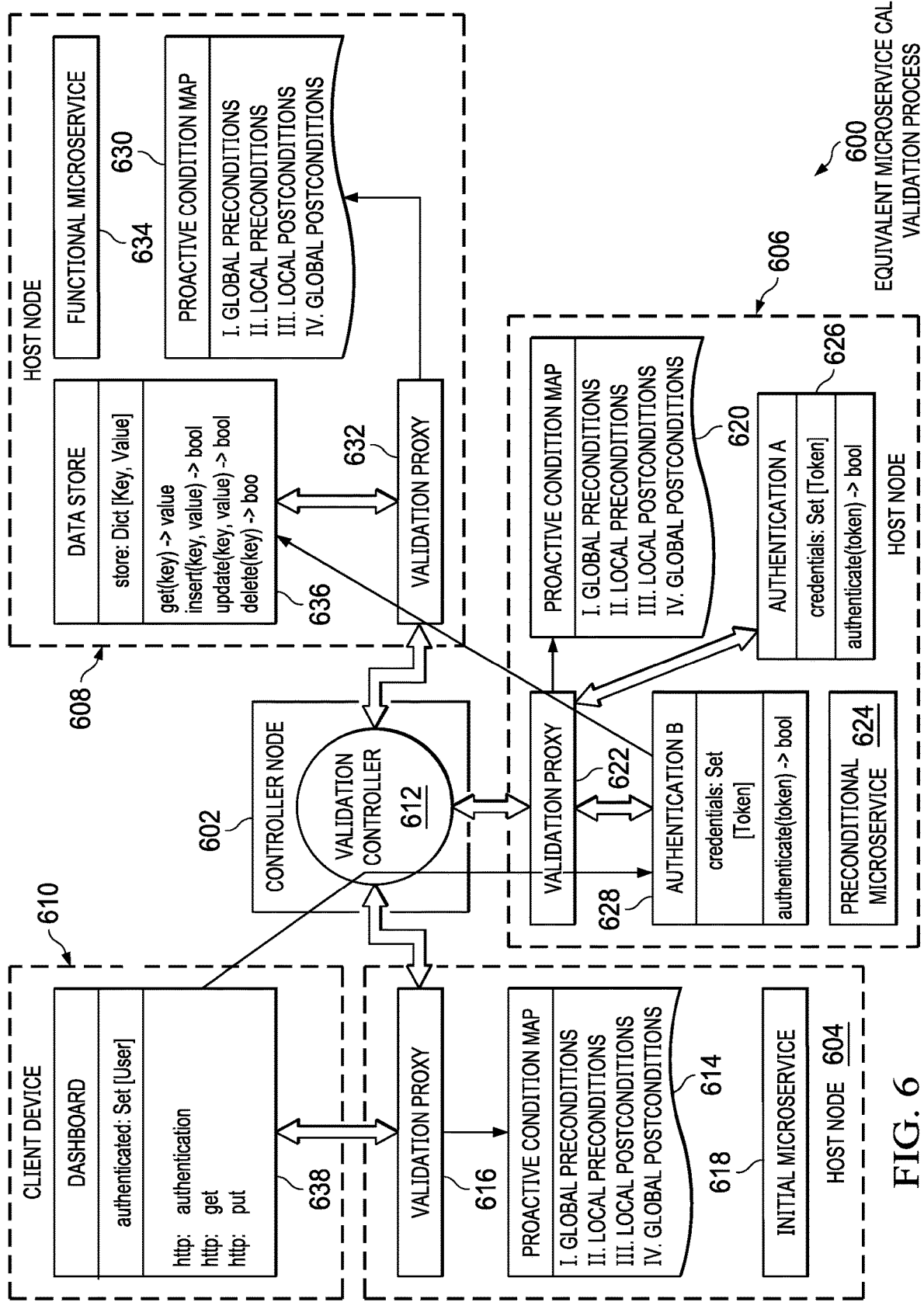
FIG. 6 is a diagram illustrating an example of an equivalent microservice call validation process in accordance with an illustrative embodiment.

With reference now to FIG. 6, a diagram illustrating an example of an equivalent microservice call validation process is depicted in accordance with an illustrative embodiment. Equivalent microservice call validation process 600 may be implemented in an orchestration environment, such as, for example, orchestration environment 300 in FIG. 3.

In this example, equivalent microservice call validation process 600 includes controller node 602, host node 604, host node 606, host node 608, and client device 610, which are similar to controller node 502, host node 504, host node 506, host node 508, and client device 510 in FIG. 5. Controller node 602 includes validation controller 612. Validation controller 612 dynamically updates proactive condition map 614 of validation proxy 616 on host node 604 with any new global validation policies corresponding to initial microservice 618. Initial microservice 618 may provide, for example, a login request page to a user of client device 610.

In addition, validation controller 612 dynamically updates proactive condition map 620 of validation proxy 622 on host node 606 with any new global validation policies corresponding to preconditional microservice 624. Preconditional microservice 624 corresponds to authentication A 626 and authentication B 628. Further, validation controller 612 dynamically updates proactive condition map 630 of validation proxy 632 on host node 608 with any new global validation policies corresponding to functional microservice 634. Functional microservice 634 corresponds to data store 636.

Equivalent microservice call validation process 600 may need an alternative type of user authentication (e.g., authentication B 628, which is equivalent to authentication A 626) be performed prior to a microservice call being posted to data store 636 of functional microservice 634. This equivalent user authentication can be expressed as, for example, equivalent microservice call validation process 600 sending a microservice call intended for data store 636 of functional microservice 634, which was received from dashboard 638 of client device 610, to authentication B 628 of preconditional microservice 624 prior to sending the microservice call to data store 636. Data store 636 of functional microservice 634 should receive a response from authentication B 628 of preconditional microservice 624 indicating that the user of client device 610 is authenticated and the microservice call is valid to proceed.

Equivalent microservice call validation process 600 controls validation of microservice calls using validation controller 612 located on controller node 602, which corresponds to host node 606 hosting preconditional microservice 624 and host node 608 hosting functional microservice 634. Validation controller 612 generates and deploys the global precondition and postcondition validation policies to corresponding validation proxies. Validation controller 612 synchronizes the global precondition and postcondition validation policies with local precondition and postcondition validation policies within the corresponding validation proxies.

Figure 7:
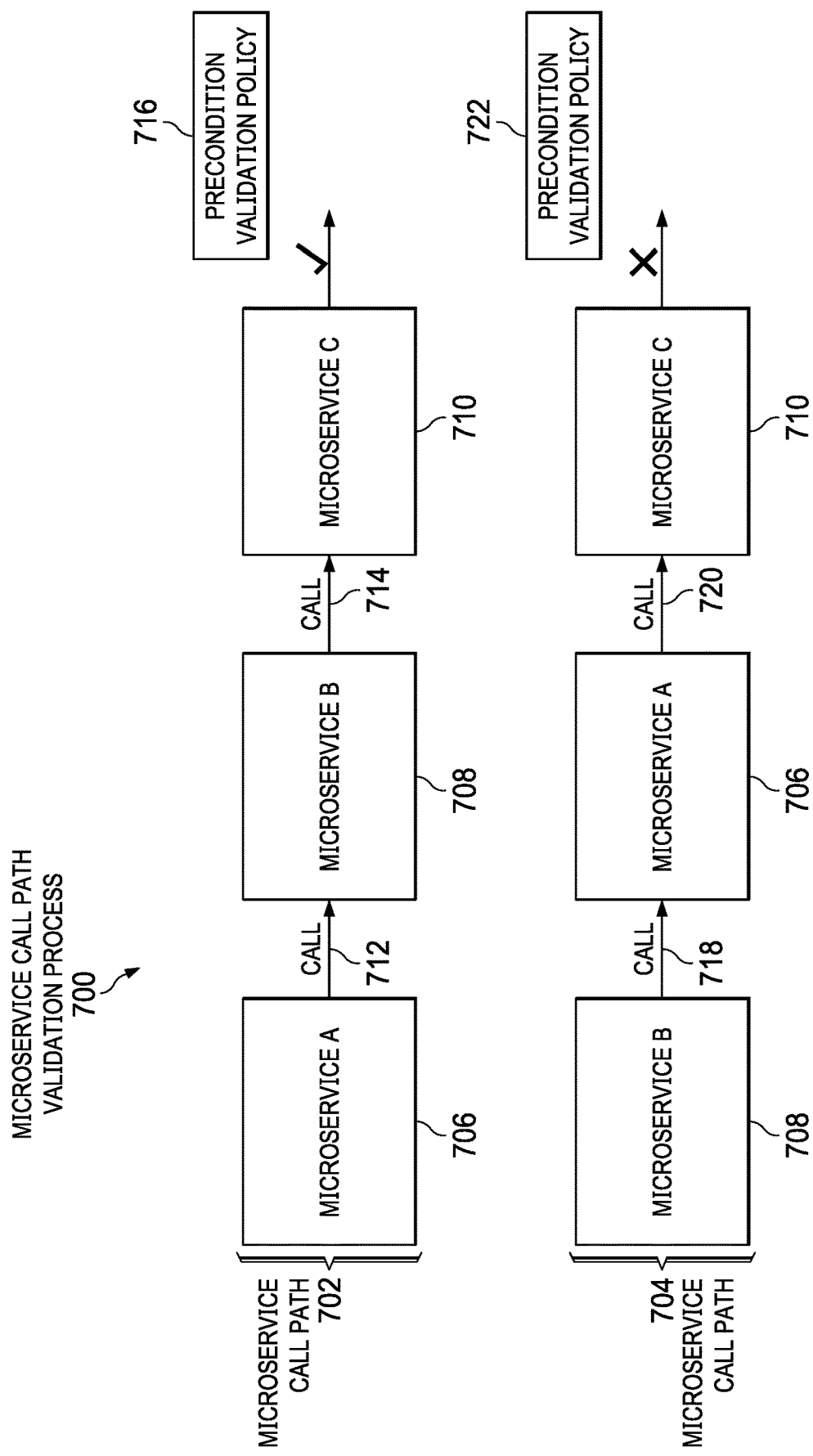
FIG. 7 is a diagram illustrating an example of a microservice call path validation process in accordance with an illustrative embodiment.

With reference now to FIG. 7, a diagram illustrating an example of a microservice call path validation process is depicted in accordance with an illustrative embodiment. Microservice call path validation process 700 may be implemented in an orchestration environment, such as, for example, orchestration environment 300 in FIG. 3.

In this example, microservice call path validation process 700 includes microservice call path 702 and microservice call path 704. It should be noted that microservice call path 702 and microservice call path 704 include microservice A 706, microservice B 708, and microservice C 710. However, it should be noted that microservice call path 702 and microservice call path 704 are intended as examples only and may include any number of microservices.

Microservice call path validation process 700 tracks and validates a call path of a series of microservice calls to generate a precondition validation policy to ensure correct order of microservice calls in accordance with dependencies between microservices. In other words, an output of one microservice in a call path may be needed by a next microservice in that call path in order for that microservice to properly perform its function of the service. Depending on the sequence of microservice calls, microservice call path validation process 700 can apply a different precondition validation policy.

For example, in microservice call path 702, at 712, microservice A 706 calls microservice B 708 and, at 714, microservice B 708 calls microservice C 710, which according to precondition validation policy 716 is valid and allowed. In contrast, in microservice call path 704, at 718, microservice B 708 calls microservice A 706 and, at 720, microservice A 706 calls microservice C 710, which according to precondition validation policy 722 is invalid and not allowed. Thus, the order of a microservice call sequence can make a difference in data consistency and security between microservices.

It should be noted that illustrative embodiments can specify and update static conditional validation policies for microservices. A static conditional validation policy can contain, for example, identification of a matching microservice, identification of a validation proxy on a host node hosting the matching microservice, a set of precondition and postcondition validation policies, matching uniform resource locator corresponding to the matching microservice, a record of a sequence of microservice calls in the call path corresponding to the matching microservice, and the like.

However, it is not enough to only have static conditional validation policies in order to perform proactive condition mapping. For example, based on analysis of microservice call paths and detection of forbidden microservice call paths during the analysis, illustrative embodiments can dynamically generate and use new conditional validation policies. This is based on analytics of data that illustrative embodiments collect from validation proxies on host nodes hosting the microservices. As a result, illustrative embodiments can convert multiple forbidden microservice calls to one or more conditional validation policies that reroute microservice calls to correct microservices (e.g., in a correct order). In addition, illustrative embodiments can adjust or combine microservice calls to multiple microservices.

Figure 8A:
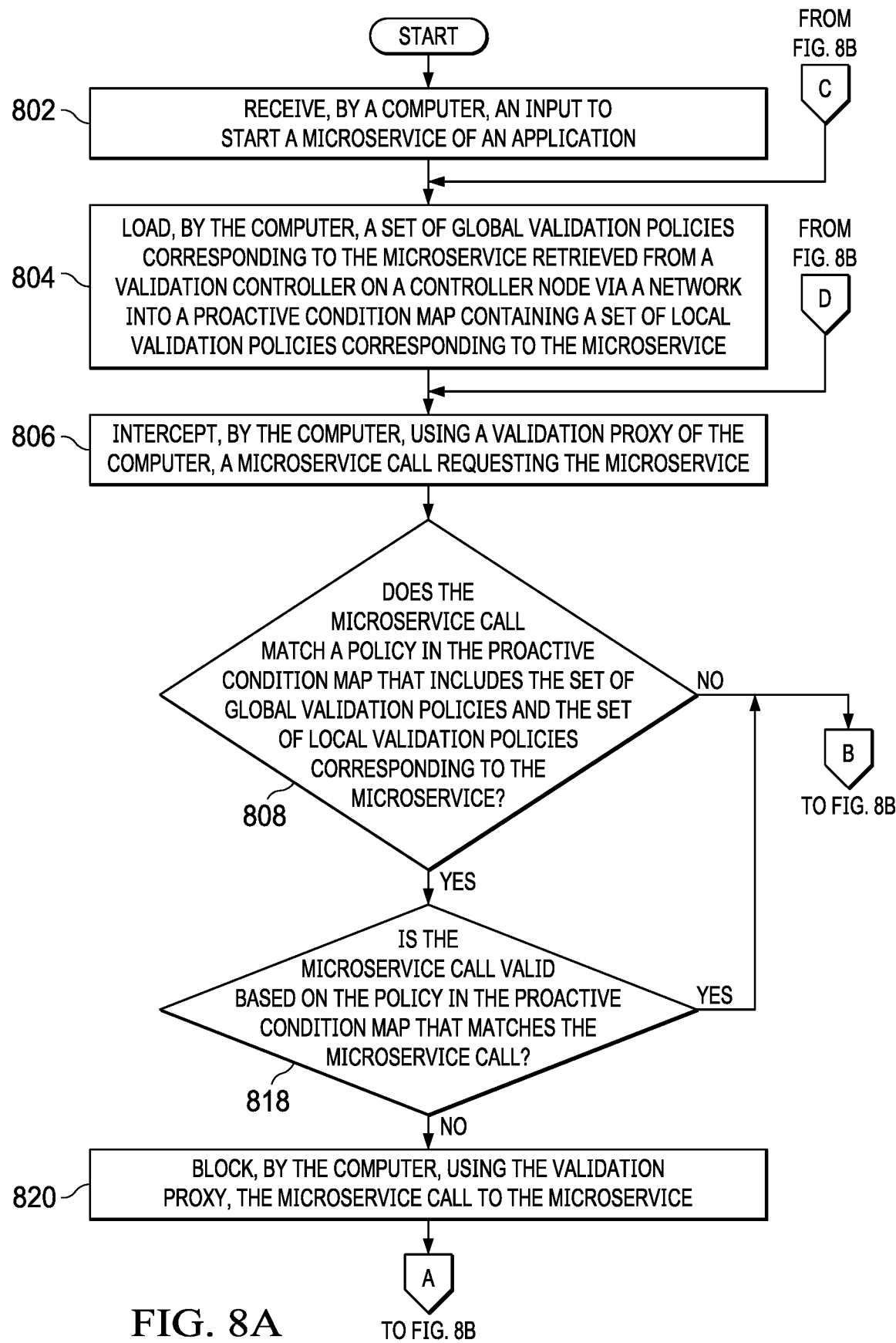
FIGS. 8A-8B are a flowchart illustrating a process for validating a microservice call in accordance with an illustrative embodiment.
Figure 8B:
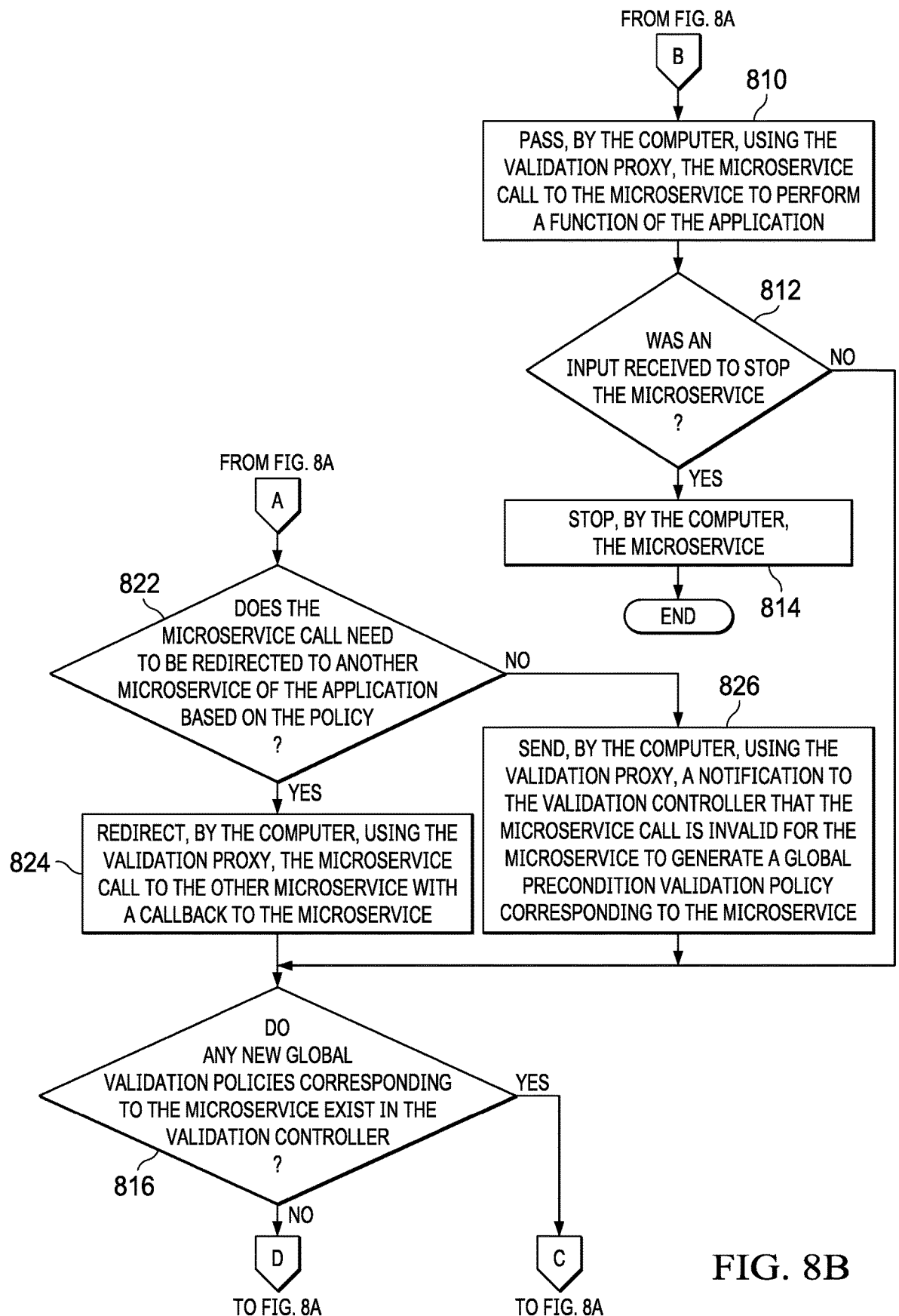

With reference now to FIGS. 8A-8B, a flowchart illustrating a process for validating a microservice call is shown in accordance with an illustrative embodiment. The process shown in FIGS. 8A-8B may be implemented in a computer, such as, for example, host node 106 in FIG. 1 or data processing system 200 in FIG. 2. For example, the process shown in FIGS. 8A-8B may be implemented in validation proxy 218 in FIG. 2.

The process begins when the computer receives an input to start a microservice of an application (step 802). In response to receiving the input to start the microservice, the computer loads a set of global validation policies corresponding to the microservice retrieved from a validation controller on a controller node via a network into a proactive condition map containing a set of local validation policies corresponding to the microservice (step 804).

Subsequently, the computer, using a validation proxy of the computer, intercepts a microservice call requesting the microservice (step 806). The computer, using the validation proxy, makes a determination as to whether the microservice call matches a policy in the proactive condition map that includes the set of global validation policies and the set of local validation policies corresponding to the microservice (step 808). If the computer, using the validation proxy, determines that the microservice call does not match a policy in the proactive condition map that includes the set of global validation policies and the set of local validation policies corresponding to the microservice, no output of step 808, then the computer, using the validation proxy, passes the microservice call to the microservice to perform a function of the application (step 810).

Afterward, the computer makes a determination as to whether an input was received to stop the microservice (step 812). If the computer determines that an input was received to stop the microservice, yes output of step 812, then the computer stops the microservice (step 814). Thereafter, the process terminates. If the computer determines that no input was received to stop the microservice, no output of step 812, then the computer, using the validation proxy, makes a determination as to whether any new global validation policies corresponding to the microservice exist in the validation controller (step 816). If the computer, using the validation proxy, determines that one or more new global validation policies corresponding to the microservice exist in the validation controller, yes output of step 816, then the process returns to step 804 where the computer loads the one or more new global validation policies corresponding to the microservice into the proactive condition map. If the computer, using the validation proxy, determines that no new global validation policies corresponding to the microservice exist in the validation controller, no output of step 816, then the process returns to step 806 where the computer waits to intercept the next microservice call requesting the microservice.

Returning again to step 808, if the computer, using the validation proxy, determines that the microservice call does match a policy in the proactive condition map that includes the set of global validation policies and the set of local validation policies corresponding to the microservice, yes output of step 808, then the computer, using the validation proxy, makes a determination as to whether the microservice call is valid based on the policy in the proactive condition map that matches the microservice call (step 818). If the computer, using the validation proxy, determines that the microservice call is valid based on the policy in the proactive condition map that matches the microservice call, yes output of step 818, then the process returns to step 810 where the computer, using the validation proxy, passes the microservice call to the microservice. If the computer, using the validation proxy, determines that the microservice call is invalid based on the policy in the proactive condition map that matches the microservice call, no output of step 818, then the computer, using the validation proxy, blocks the microservice call to the microservice (step 820).

Further, the computer, using the validation proxy, makes a determination as to whether the microservice call needs to be redirected to another microservice of the application based on the policy (step 822). If the computer, using the validation proxy, determines that the microservice call does need to be redirected to another microservice of the application based on the policy, yes output of step 822, then the computer, using the validation proxy, redirects the microservice call to the other microservice with a callback to the microservice (step 824). Thereafter, the process returns to step 816 where the computer, using the validation proxy, determines whether there are any new global validation policies. If the computer, using the validation proxy, determines that the microservice call does not need to be redirected to another microservice of the application based on the policy, no output of step 822, then the computer, using the validation proxy, sends a notification to the validation controller that the microservice call is invalid for the microservice to generate a global precondition validation policy corresponding to the microservice (step 826). Thereafter, the process returns to step 816 where the computer determines whether there are any new global validation policies.

Figure 9A:
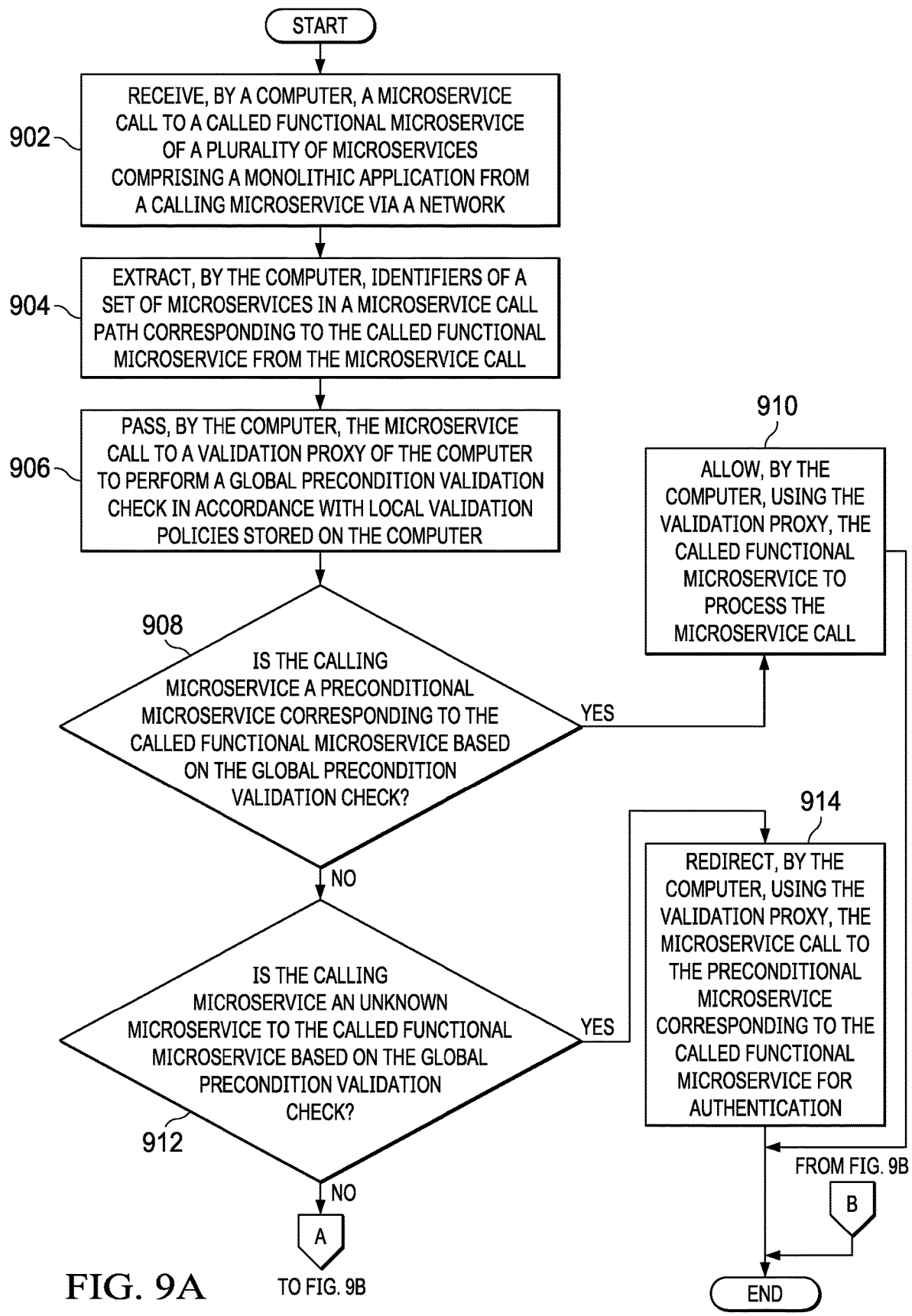
FIGS. 9A-9B are a flowchart illustrating a process for generating a proactive condition map in accordance with an illustrative embodiment.
Figure 9B:
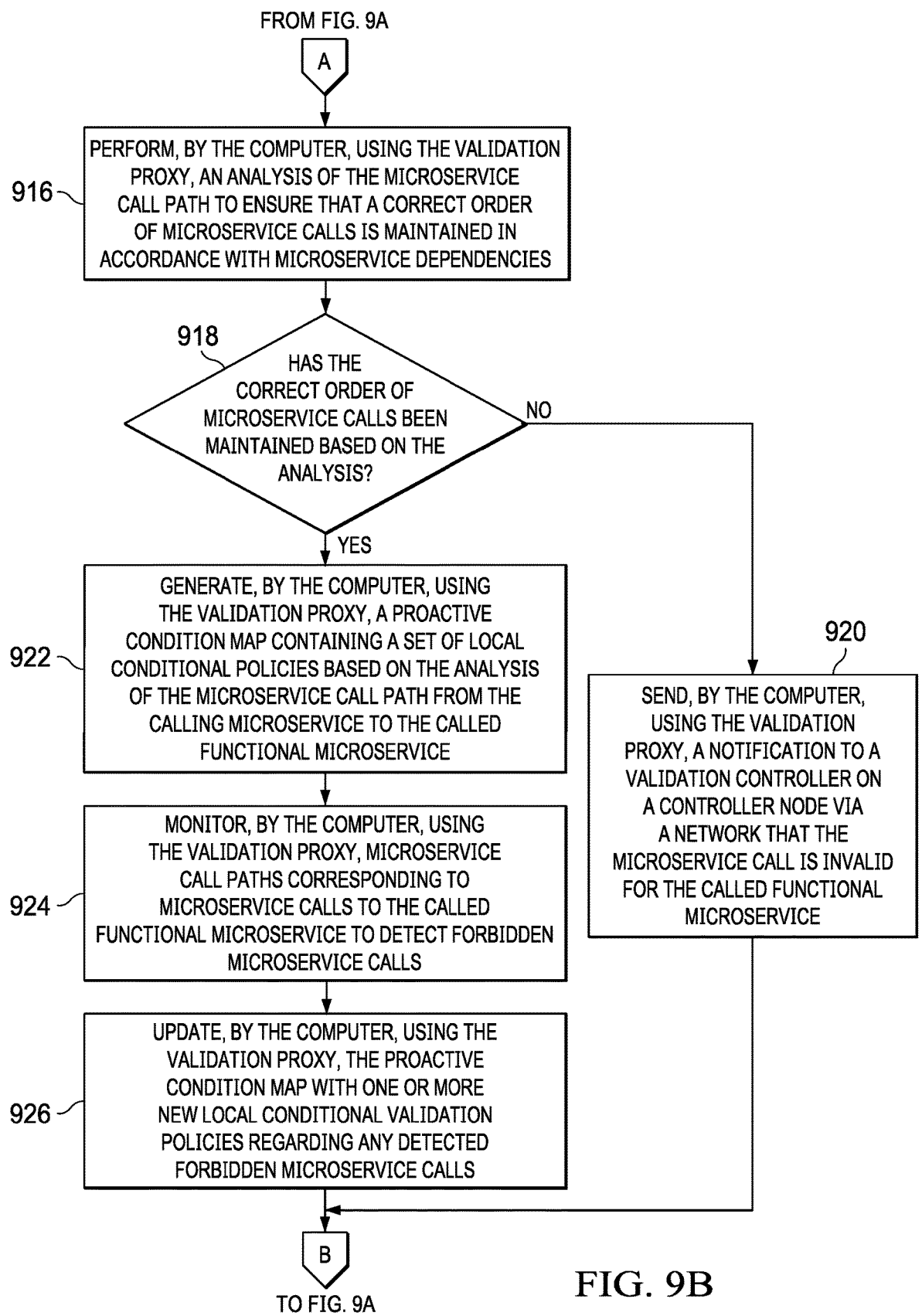

With reference now to FIGS. 9A-9B, a flowchart illustrating a process for generating a proactive condition map is shown in accordance with an illustrative embodiment. The process shown in FIGS. 9A-9B may be implemented in a computer, such as, for example, host node 106 in FIG. 1 or data processing system 200 in FIG. 2. For example, the process shown in FIGS. 9A-9B may be implemented in validation proxy 218 in FIG. 2.

The process begins when the computer receives a microservice call to a called functional microservice of a plurality of microservices comprising a monolithic application from a calling microservice via a network (step 902). In response to receiving the microservice call, the computer extracts identifiers of a set of microservices in a microservice call path corresponding to the called functional microservice from the microservice call (step 904). In addition, the computer passes the microservice call to a validation proxy of the computer to perform a global precondition validation check in accordance with local validation policies stored on the computer (step 906).

Afterward, the computer, using the validation proxy, makes a determination as to whether the calling microservice is a preconditional microservice corresponding to the called functional microservice based on the global precondition validation check (step 908). If the computer, using the validation proxy, determines that the calling microservice is a preconditional microservice corresponding to the called functional microservice based on the global precondition validation check, yes output of step 908, then the computer, using the validation proxy, allows the called functional microservice to process the microservice call (step 910). Thereafter, the process terminates.

If the computer, using the validation proxy, determines that the calling microservice is not a preconditional microservice corresponding to the called functional microservice based on the global precondition validation check, no output of step 908, then the computer, using the validation proxy, makes a determination as to whether the calling microservice is an unknown microservice to the called functional microservice based on the global precondition validation check (step 912). If the computer, using the validation proxy, determines that the calling microservice is an unknown microservice to the called functional microservice based on the global precondition validation check, yes output of step 912, then the computer, using the validation proxy, redirects the microservice call to the preconditional microservice corresponding to the called functional microservice for authentication (step 914). Thereafter, the process terminates. If the computer, using the validation proxy, determines that the calling microservice is a known microservice to the called functional microservice based on the global precondition validation check, no output of step 912, then the computer, using the validation proxy, performs an analysis of the microservice call path to ensure that a correct order of microservice calls is maintained in accordance with microservice dependencies (step 916).

The computer, using the validation proxy, makes a determination as to whether the correct order of microservice calls been maintained based on the analysis (step 918). If the computer, using the validation proxy, determines that the correct order of microservice calls has not been maintained based on the analysis, no output of step 918, then the computer, using the validation proxy, sends a notification to a validation controller on a controller node via a network that the microservice call is invalid for the called functional microservice (step 920). Thereafter, the process terminates. If the computer, using the validation proxy, determines that the correct order of microservice calls has been maintained based on the analysis, yes output of step 918, then the computer, using the validation proxy, generates a proactive condition map containing a set of local conditional policies based on the analysis of the microservice call path from the calling microservice to the called functional microservice (step 922).

Furthermore, the computer, using the validation proxy, monitors microservice call paths corresponding to microservice calls to the called functional microservice to detect forbidden microservice calls (step 924). Moreover, the computer, using the validation proxy, updates the proactive condition map with one or more new local conditional validation policies regarding any detected forbidden microservice calls (step 926). Thereafter, the process terminates.

Thus, illustrative embodiments of the present invention provide a computer-implemented method, computer system, and computer program product for utilizing a validation proxy on a host node to secure microservices in an orchestration environment. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for validating microservice calls, the computer-implemented method comprising:
   determining, by a computer, using a validation proxy of the computer, whether a microservice call to a microservice hosted by the computer is valid based on a policy in a proactive condition map of the validation proxy that matches the microservice call;
   responsive to the computer determining that the microservice call is invalid based on the policy in the proactive condition map that matches the microservice call, blocking, by the computer, using the validation proxy, the microservice call to the microservice;
   determining, by the computer, using the validation proxy, whether the microservice call needs to be redirected to another microservice based on the policy;
   responsive to the computer determining that the microservice call does need to be redirected to another microservice based on the policy, redirecting, by the computer, using the validation proxy, the microservice call to the other microservice with a callback to the microservice;
   responsive to the redirection of the invalid microservice call, determining, by the computer, whether any new validation policies corresponding to the microservice exist in a validation controller of a controller node;
   responsive to the computer determining that one or more new validation policies corresponding to the microservice exist in the validation controller, loading, by the computer, the one or more new validation policies corresponding to the microservice into the proactive condition map of the validation proxy; and
   intercepting, by the computer, using the validation proxy, the microservice call requesting the microservice based on the one or more new validation policies.

2. The computer-implemented method of claim 1 further comprising:
   responsive to the computer determining that the microservice call does not need to be redirected to another microservice based on the policy, sending, by the computer, using the validation proxy, notification to a validation controller of a controller node that the microservice call is invalid for the microservice to generate a global precondition validation policy corresponding to the microservice.

3. The computer-implemented method of claim 1 further comprising:
   responsive to the computer determining that the microservice call is valid based on the policy in the proactive condition map that matches the microservice call, passing, by the computer, using the validation proxy, the microservice call to the microservice to perform a function.

4. The computer-implemented method of claim 1 further comprising:
   receiving, by the computer, an input to start the microservice of an application that provides a service; and
   loading, by the computer, a set of global validation policies corresponding to the microservice retrieved from a validation controller on a controller node via a network into the proactive condition map containing a set of local validation policies corresponding to the microservice.

5. The computer-implemented method of claim 1 further comprising:
   determining, by the computer, whether any new global validation policies corresponding to the microservice exist in a validation controller of a controller node; and
   responsive to the computer determining that one or more new global validation policies corresponding to the microservice exist in the validation controller, loading, by the computer the one or more new global validation policies corresponding to the microservice into the proactive condition map of the validation proxy.

6. The computer-implemented method of claim 1 further comprising:
   receiving, by the computer, the microservice call to the microservice from a calling microservice, wherein the microservice is a functional microservice of a plurality of microservices comprising an application that provides a service;
   extracting, by the computer, identifiers of a set of microservices in a microservice call path corresponding to the functional microservice from the microservice call in response to receiving the microservice call; and
   passing, by the computer, the microservice call to the validation proxy of the computer to perform a global precondition validation check in accordance with local validation policies stored in the proactive condition map of the validation proxy on the computer.

7. The computer-implemented method of claim 6 further comprising:
   determining, by the computer, whether the calling microservice is a preconditional microservice corresponding to the functional microservice based on the global precondition validation check; and
   responsive to the computer determining that the calling microservice is a preconditional microservice corresponding to the functional microservice based on the global precondition validation check, allowing, by the computer, using the validation proxy, the functional microservice to process the microservice call.

8. The computer-implemented method of claim 7 further comprising:
   determining, by the computer, whether the calling microservice is an unknown microservice to the functional microservice based on the global precondition validation check; and
   responsive to the computer determining that the calling microservice is an unknown microservice to the functional microservice based on the global precondition validation check, redirecting, by the computer, using the validation proxy, the microservice call to the preconditional microservice corresponding to the functional microservice for authentication.

9. The computer-implemented method of claim 6 further comprising:
   performing, by the computer, using the validation proxy, an analysis of the microservice call path to ensure that a correct order of microservice calls is maintained in accordance with microservice dependencies; and generating, by the computer, using the validation proxy, the proactive condition map containing a set of local conditional policies based on the analysis of the microservice call path from the calling microservice to the functional microservice.

10. The computer-implemented method of claim 6 further comprising:
monitoring, by the computer, using the validation proxy, microservice call paths corresponding to microservice calls to the functional microservice to detect forbidden microservice calls; and
updating, by the computer, using the validation proxy, the proactive condition map with one or more new local conditional validation policies regarding any detected forbidden microservice calls.

11. A computer system for validating microservice calls, the computer system comprising:
a bus system;
a storage device connected to the bus system, wherein the storage device stores program instructions; and
a processor device connected to the bus system, wherein the processor executes the program instructions to:
determine, using a validation proxy of the computer system, whether a microservice call to a microservice hosted by the computer system is valid based on a policy in a proactive condition map of the validation proxy that matches the microservice call;
block, using the validation proxy, the microservice call to the microservice in responsive to determining that the microservice call is invalid based on the policy in the proactive condition map that matches the microservice call;
determine, using the validation proxy, whether the microservice call needs to be redirected to another microservice based on the policy;
redirect, using the validation proxy, the microservice call to the other microservice with a callback to the microservice in response to determining that the microservice call does need to be redirected to another microservice based on the policy;
responsive to the redirection of the invalid microservice call, determine, whether any new validation policies corresponding to the microservice exist in a validation controller of a controller node;
responsive to the computer determining that one or more new validation policies corresponding to the microservice exist in the validation controller, load the one or more new validation policies corresponding to the microservice into the proactive condition map of the validation proxy; and
intercept, using the validation proxy, the microservice call requesting the microservice based on the one or more new validation policies.

12. The computer system of claim 11, wherein the processor further executes the program instructions to:
send, using the validation proxy, notification to a validation controller of a controller node that the microservice call is invalid for the microservice to generate a global precondition validation policy corresponding to the microservice in response to determining that the microservice call does not need to be redirected to another microservice based on the policy.

13. The computer system of claim 11, wherein the processor further executes the program instructions to:
pass, using the validation proxy, the microservice call to the microservice to perform a function in response to determining that the microservice call is valid based on the policy in the proactive condition map that matches the microservice call.

14. The computer system of claim 11, wherein the processor further executes the program instructions to:
receive an input to start the microservice of an application that provides a service; and
load a set of global validation policies corresponding to the microservice retrieved from a validation controller on a controller node via a network into the proactive condition map containing a set of local validation policies corresponding to the microservice.

15. The computer system of claim 11, wherein the processor further executes the program instructions to:
determine whether one or more new global validation policies corresponding to the microservice exist in a validation controller of a controller node; and
load the one or more new global validation policies corresponding to the microservice into the proactive condition map of the validation proxy in response to determining that the one or more new global validation policies corresponding to the microservice exist in the validation controller.

16. A computer program product for validating microservice calls, the computer program product comprising a computer-readable storage medium having program instructions embodied therewith, the program instructions executable by a computer to cause the computer to perform a method of:
determining, by the computer, using a validation proxy of the computer, whether a microservice call to a microservice hosted by the computer is valid based on a policy in a proactive condition map of the validation proxy that matches the microservice call;
responsive to the computer determining that the microservice call is invalid based on the policy in the proactive condition map that matches the microservice call, blocking, the computer, using the validation proxy, the microservice call to the microservice;
determining, by the computer, using the validation proxy, whether the microservice call needs to be redirected to another microservice based on the policy; and
responsive to the computer determining that the microservice call does need to be redirected to another microservice based on the policy, redirecting, by the computer, using the validation proxy, the microservice call to the other microservice with a callback to the microservice;
responsive to the redirection of the invalid microservice call, determining, by the computer, whether any new validation policies corresponding to the microservice exist in a validation controller of a controller node;
responsive to the computer determining that one or more new validation policies corresponding to the microservice exist in the validation controller, loading, by the computer, the one or more new validation policies corresponding to the microservice into the proactive condition map of the validation proxy; and
intercepting, by the computer, using the validation proxy, the microservice call requesting the microservice based on the one or more new validation policies.

17. The computer program product of claim 16 further comprising:
responsive to the computer determining that the microservice call does not need to be redirected to another microservice based on the policy, sending, by the computer, using the validation proxy, notification to a validation controller of a controller node that the microservice call is invalid for the microservice to generate a global precondition validation policy corresponding to the microservice.

18. The computer program product of claim 16 further comprising:

responsive to the computer determining that the microservice call is valid based on the policy in the proactive condition map that matches the microservice call, passing, by the computer, using the validation proxy, the microservice call to the microservice to perform a function.

19. The computer program product of claim 16 further comprising:

receiving, by the computer, an input to start the microservice of an application that provides a service; and loading, by the computer, a set of global validation policies corresponding to the microservice retrieved from a validation controller on a controller node via a network into the proactive condition map containing a set of local validation policies corresponding to the microservice.

20. The computer program product of claim 16 further comprising:

determining, by the computer, whether any new global validation policies corresponding to the microservice exist in a validation controller of a controller node; and responsive to the computer determining that one or more new global validation policies corresponding to the microservice exist in the validation controller, loading, by the computer the one or more new global validation policies corresponding to the microservice into the proactive condition map of the validation proxy.

* * * * *